Patented Dec. 13, 1949

2,490,927

UNITED STATES PATENT OFFICE 2,490,927

CONDENSATION PRODUCTS OF RESORCINOL AND FORMALDEHYDE

Raymond J. Spahr and David J. Lieb, Bainbridge, N. Y., assignors to The Borden Company, New York, N. Y., a corporation of New Jersey No Drawing. Application February 8, 1945, Serial No. 576,904

8 Claims. (Cl. 260—54)

This invention relates to condensation products and more particularly to products produced from resorcinol and formaldehyde.

An object of this invention is to bond materials at room temperature to effect a jointure which is capable of withstanding extreme weather conditions.

Another object of this invention is the provision of a resin glue capable of being cured at room temperature and which produces an adhesive bond which is completely durable when exposed to extreme weather conditions and which is not subject to deterioration when exposed to mold and fungus growth.

Another object of this invention is to bond effectively at room temperature a plurality of surfaces of wood having a low moisture content.

In secondary gluing, such as the assembly of wood to wood, and plywood to framework members, where heat cannot readily be applied, it has been common practice to use urea-formaldehyde resins as joint adhesives. Although urea resins are more durable than the older types of joint adhesives such as animal glue and casein glue, they do not provide the weather-resistant bonds which can be obtained with phenol-formaldehyde resin glues. In particular, urea-formaldehyde resins bonds are not resistant to elevated temperatures, and when exposed to temperatures above 140° F., they undergo decomposition.

Urea-formaldehyde resin adhesives have several other drawbacks, one of which is their very short assembly period. In gluing operations the term "assembly period" refers to the time which elapses between applying the adhesive to the surfaces to be joined, and applying pressure to the joint. The maximum assembly period permitted in using urea assembly adhesives is 20 minutes when the shop temperature is 75° F. Higher temperatures necessitate an even shorter assembly period. If the pressure period exceeds 20 minutes at 75° F., practically no transfer of glue takes place between the spread surfaces, and a weak joint results.

The moisture content of the wood being glued has an important influence on the strength of the joint when an adhesive of the urea-formaldehyde type is used as the glue. Best results with urea resins are obtained when the wood has a moisture content between 8 and 12%. A poor joint results when the moisture content of the wood is about 5% or below due to the excessive penetration of the moisture in the glue into the wood. Since moisture is required to bring about the chemical reaction which takes place in curing urea joint resins, the loss of moisture to the wood retards or prevents this reaction from taking place.

Although phenol-formaldehyde resins provide glue bonds which are completely resistant to all types of weathering conditions, it has not been found possible to catalyse effectively these resins so that they can be cured at normal workroom temperatures. Strong acidic hardening agents have been used with phenolic resins in order to lower their setting temperature, but such acidic materials adversely affect wood fibers and produce a joint having very poor strength.

Moreover, acid-catalyzed phenolic resin glues cure very slowly at room temperature, and joints made with these glues must be kept in retaining clamps for at least 12 hours before releasing the pressure. In applications in which a rapid rate of production is essential, a long pressure period is highly undesirable.

In the gluing of laminated members such as boat keels, arches, and trusses, it is impractical to use urea-formaldehyde adhesives because of their poor weathering qualities. Attempts have been made to glue such members with a high-temperature curing phenol-formaldehyde resin, and to cure the resin by means of high frequency heating. It was found that these resins arc badly in a high frequency field, and that tracks were burned across the glue line. Curing with high frequency reduces the curing period from a period of hours to a period of seconds, and is of considerable practical value in the high-speed production of laminated members.

Accordingly, neither the urea-formaldehyde resin glues nor the phenol formaldehyde resin glues fulfill the desirable requirements of curing at room temperature, of being capable of withstanding relatively severe weathering conditions, and of bonding relatively firmly woods containing as low as 2% moisture.

In accordance with this invention, materials are bonded together with a synthetic resin glue which is cured at room temperature and which is not weakened either by continuous soaking in water or by subjecting it to extreme weather conditions such as elevated temperatures or sub-zero temperatures, and which is not subject to deterioration when exposed to mold and fungus growth. Moreover, the synthetic resin glue of this invention bonds relatively firmly woods containing as low as 2% moisture. The compositions of this invention may be cured at a temperature of about 75° F. and require a maximum pressure period of 4 hours on soft wood and 6 hours on hard wood. They may be cured by high frequency heating and do not arc and carbonize.

The compositions of this invention comprise a condensation product at a pH between 6.2 and 7.5 of resorcinol with formaldehyde in the proportion of 0.5 to 0.73 mol of formaldehyde per mol of resorcinol. The composition also includes a water soluble polyhydric alcohol in the proportion of 10 to 100 parts by weight of the polyhydric alcohol per 100 parts by weight of resorcinol. For some applications it is desirable to include, in addition, a water soluble monohydric alcohol in the proportion of 10 to 65 parts by weight of the monohydric alcohol per 100 parts by weight of resorcinol. Shortly prior to using the composition it is necessary to add formaldehyde in its monomeric or polymeric form in an amount such that the total quantity of formaldehyde is 0.8 to 1.6 mols for each mol of resorcinol in the condensation product.

In accordance with the invention, the resorcinol is condensed with formaldehyde in the presence of a non-volatile alkali, such as caustic soda, caustic potash, soda ash or lime, and either in the presence or in the absence of the water-soluble monohydric alcohol, such as ethyl alcohol, and the polyhydric alcohol, such as glycerine, ethylene glycol or glucose. The amount of non-volatile alkali added should be sufficient to maintain the pH of the reaction mixture between 6.2 and 7.5. The solution is then heated to 80 to 100° C. and preferably to reflux and maintained at that point until the resin solution undergoes no further change in viscosity. In the event that the polyhydric alcohol is not incorporated in the reaction mixture, it is added after the completion of the condensation reaction.

The mol ratio of formaldehyde used in preparing the resin influences its shelf life and the reactivity of the resulting glue. Stable products, having an indefinite shelf life, are obtained by using 0.5 to 0.73 mol of formaldehyde per mol of resorcinol. When the mol ratio of formaldehyde employed is less than 0.5 mol, a glue is obtained which cures very slowly at room temperature and is not commercially practical. On the other hand, when the mol ratio of formaldehyde exceeds 0.73 mol, the shelf life of the resulting resin is impaired, especially at temperatures above 90° F., and a glue prepared with such resins is characterized by a short pot life, and a very short assembly period.

In order to cure the resins prepared according to this invention, it is necessary to add paraformaldehyde, formaldehyde, or some substance that yields formaldehyde at the temperatures employed in curing the construction. Both liquid formaldehyde and paraformaldehyde are particularly well suited as addition agents for this purpose.

In producing resin solutions according to this invention, it is important to prepare a product that is completely miscible with water so that its viscosity can be easily adjusted, that it can be readily handled and that it can be washed from spreader rolls. In order to produce a resin which is completely water soluble, it is necessary to use sufficient alkaline materials to obtain a pH between 6.2 and 7.5. The preferable pH range is between 6.8 and 7.2. When the pH of the resin solution is below 6.2, its water tolerance is seriously impaired. Strong non-volatile alkalies, such as caustic soda, caustic potash or the like, are preferred as catalysts in the preparation of these resins.

When the monomer, liquid formaldehyde, is used in curing the resins described herein, it is necessary that the pH of the resin solution be adjusted to within the limits of 6.3 to 6.6. When the pH exceeds 6.6, a violent exothermic reaction takes place on mixing the monomeric formaldehyde and the resin, and unless the glue mix is cooled until the exothermic reaction has subsided, it gels in a period of less than one hour. Resin glue mixers are not normally jacketed, and cooling a large batch of this glue is not commercially practical. In order to avoid a change in pH, it is advisable to adjust the pH of the formaldehyde to approximately 6.5 with trisodium phosphate prior to mixing with the resin solution. When the polymer, paraformaldehyde, is used in curing these resins, it is recommended that the pH of the resin solution be adjusted to within the limits of 6.8 to 7.2 before adding the paraformaldehyde. If the pH of the resin solution is below 6.8, depolymerization of the paraformaldehyde takes place very slowly and the cure of the resin glue is retarded, especially at temperatures of 75–80° F. When the pH of the resin solution is above 7.2, a violent exothermic reaction takes place when the paraformaldehyde undergoes depolymerization. Optimum results are obtained when the resin solution has a pH of approximately 7.0. If the resins are to be cured immediately after their preparation, they are cooled to a temperature below 30° C. before the addition of the monomer, formaldehyde, or the polymer, paraformaldehyde.

Resins prepared by condensing resorcinol and formaldehyde in the presence of an alkaline catalyst are not satisfactory as wood adhesives unless the glue contains a small amount of a water soluble polyhydric alcohol. In the absence of such a material a glue is obtained which has little or no affinity for wood, and which produces glue joints which are lacking in strength and which fail completely at the glue line. A well-made joint gives a high shear strength and fails almost completely in the wood, and not in the glue line. The addition of a water soluble polyhydric alcohol, such as glycerine, sorbitol, ethylene glycol or the like, in the proportion of 10 to 100 parts by weight of the polyhydric alcohol per 100 parts of resorcinol produces a glue which provides both high shear strength and high wood failure. No explanation is known for the failure resulting from the use of a glue formulated without the polyhydric alcohol. It has been found that the squeeze-out obtained with such a glue has a granular, sandy appearance, and has very little strength, whereas a glue containing a water soluble polyhydric alcohol gives a squeeze-out that is of rigid, glass-like appearance and is very tough. The polyhydric alcohol either can be reacted with the formaldehyde and resorcinol or can be added at the completion of the condensation period just prior to cooling the finished resin to room temperature. Optimum results are obtained by using from 10 to 30 parts by weight of polyhydric alcohol per 100 parts by weight of resorcinol. Satisfactory results are obtained using as high as 100 parts by weight of polyhydric alcohol per 100 parts by weight of resorcinol. Higher quantities retard the rate of cure of the glue.

Mixtures of different water soluble polyhydric alcohols may be employed instead of a single water soluble polyhydric alcohol. The total amount of all water soluble polyhydric alcohol employed in the composition should however be 10 to 100 parts by weight of the total polyhydric alcohol per 100 parts by weight of resorcinol. For example, a mixture of glycerine and sorbitol may be added to the condensation product of resorcinol and formaldehyde, the total combined quantity of the sorbitol and glycerine being 10 to 100 parts by weight of the resorcinol present.

The presence of a water soluble monohydric alcohol, such as methyl, ethyl or propyl alcohol, in the glue is necessary if satisfactory adhesion is to be obtained on hardwoods, such as maple, birch and the like. Satisfactory shear strengths and wood failure can be obtained on softwoods, such as fir, spruce and poplar in the absence of a monohydric alcohol, although such glues are lacking in specific adhesion. The presence of a monohydric alcohol appears to increase the specific adhesion of the glue and to be directly responsible for the high joint strengths obtainable on hardwoods. The monohydric alcohol can be added either at the start of the reaction or at the completion of the condensation period. Satisfactory results are obtained using from 10 to 65 parts by weight of monohydric alcohol per 100 parts by weight of resorcinol.

The following examples are given of the preparation of resins in accordance with this invention, but they are simply illustrative and there is no intention of limiting the invention to the details given herein.

*Example I.*—Five hundred and fifty pounds of resorcinol, 244 pounds of 37% formaldehyde, 138 pounds of denatured ethyl alcohol and 110 pounds of 2-ethyl hexanediol-1-3 are charged into a jacketed kettle equipped with a stirring device and a reflux condenser. The mix is agitated until the resorcinol dissolves, and 38 pounds of 28.5% caustic soda solution is added. The addition of the caustic soda solution causes an exothermic reaction to take place, and this carries the temperature of the solution to 100° C. It is usually necessary to circulate water through the jacket in order to moderate the exothermic nature of this reaction. The batch is refluxed for 2 or 3 hours, or until no further increase in viscosity takes place on further refluxing. At the completion of the reaction the resin solution has a viscosity of approximately "V" on the Gardner bubble viscometer. Approximately 32 pounds of denatured ethyl alcohol is added to the batch, and it is then cooled to room temperature.

The finished resin solution has a viscosity of 120 to 150 at 70° F. as determined on a Stormer viscometer using a 500 gram weight, its pH is between 6.9 and 7.3, and its solids content is approximately 63%.

These Stormer viscosity values and all Stormer viscosity values to which reference is hereinafter made are determined by the number of rotations which the spindle makes in a period of one minute.

*Example II.*—Eleven hundred pounds of resorcinol, 486 pounds of 37% formaldehyde and 330 pounds of denatured alcohol are charged into a steam-jacketed kettle equipped with a stirring device and a reflux condenser. The mix is agitated until the resorcinol has dissolved, and 52 pounds of a 28.5% solution of caustic soda is added. An exothermic reaction develops which carries the batch temperature to 100° C. The batch is refluxed for 2 hours, and 220 pounds of glycerine and 96 pounds of denatured ethyl alcohol are added, and the solution cooled to room temperature.

The finished resin solution has a viscosity of 130 to 160 at 70° F. as determined on a Stormer viscometer using a 500 gram weight, its pH is between 6.9 to 7.3, and its solids content is approximately 61%.

*Example III.*—A steam-jacketed kettle is charged with 550 pounds of resorcinol, 264 pounds of 37% formaldehyde, 110 pounds of glycerine and 165 pounds of water. The mixture is agitated until the resorcinol has dissolved, and 14 pounds of a 28.5% solution of caustic soda are then added. An exothermic reaction ensues which carries the batch temperature to 100° F. The batch is refluxed for 1½ to 2 hours, and thirty pounds of water are then added, and the batch cooled to room temperature.

The finished resin solution has a viscosity of 140–160 at 70° F. as determined on a Stormer viscometer using a 500 gram weight, its pH is between 6.2 and 6.5, and it has a solids content of approximately 48%.

*Example IV.*—2400 lbs. of resorcinol, 1063 lbs. of formaldehyde (37%), 480 lbs. glycerine and 720 of denatured alcohol are charged into a steam jacketed kettle equipped with a stirring device and a reflux condenser. The mix is agitated until the resorcinol dissolves, and 150 lbs. of 28.5% caustic soda solution is then added. The addition of the alkaline catalyst causes an exothermic reaction to take place and this carries the temperature of the solution to 100° C. It is usually necessary to circulate water through the kettle jacket in order to moderate the exothermic nature of this reaction. The batch is refluxed for about 2 hours, or until no further increase in viscosity takes place on further refluxing. At the completion of the reaction the resin solution has a viscosity of approximately S on the Gardner bubble viscometer, approximately 115 lbs. of denatured alcohol is added to the batch and is then cooled to room temperature. The finished resin solution has a viscosity of about 140–160 at 70° F. as determined on a Stormer viscometer using a 500 gram weight, its pH is approximately 7.0 to 7.1 and its solids content is between 61 and 62%.

The resins prepared according to this invention may be mixed with various extenders, such as wood flour or walnut shell flour, as is understood by those skilled in the art.

When the glue is being prepared for spreading, an amount of liquid formaldehyde, paraformaldehyde or a similar material furnishing formaldehyde should be added to bring the total quantity of formaldehyde in the product up to approximately 0.8 to 1.6 mol for each mol of resorcinol employed. It is apparent, therefore, that the exact amount of paraformaldehyde or the like added at this stage depends entirely on the proportion of formaldehyde that is used initially in preparing the resin solution. Slightly smaller or larger quantities of paraformaldehyde or the like may be added at this stage depending upon the time that the glue has to remain in a heat convertible condition after it is spread, the temperature at which the glue is to be cured, the time of curing desired, and similar factors.

Paraformaldehyde does not disperse readily in the resins prepared according to this invention. When used alone it tends to agglomerate into small balls which dissolve very slowly, and as a result the curing characteristics of the glue are altered. By dry-mixing the paraformaldehyde with a small quantity of a finely-divided inert filler, such as wood flour, a powder is obtained which disperses almost instantaneously in the resin solution.

The use of liquid formaldehyde as the catalyst necessitates the use of a heavier-bodied resin than is the case when the glue is catalyzed with paraformaldehyde. A glue having a suitable spreading viscosity can be obtained by using a resin solution having a Stormer viscosity of 15 to 30 at 70° F., and by adding 5 to 10 parts of finely-divided wood flour or walnut-shell flour per 100 parts by weight of resin solution. A free-flowing, lump-free solution can be obtained by dispersing the filler in the resin solution prior to adding the formaldehyde solution.

After adding the catalyst, the glue mix has a usable life of about four hours at 70° F., about two and one-half hours at 80° F., and about one hour at 90° F. In joint work and in laminating, double spreading is recommended, especially if rough-cut, uneven surfaces are being glued together. Double-spreading increases the allowable assembly period and this factor is important when the shop temperature exceeds 80° F.

These glues have been described as being particularly useful in the secondary gluing of wood, and in wood laminating operations. It is to be understood, however, that they are excellent bonding agents for paper, rockwool, laminated plastics and "compregnated wood" and the like.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. A water soluble resinous product produced by the condensation of resorcinol with formaldehyde in the proportion of 0.5 to 0.73 mol of formaldehyde per mol of resorcinol and containing 10 to 100 parts of a water soluble polyhydroxy alkane per 100 parts by weight of resorcinol, said polyhydroxy alkane having not more than six carbon atoms and said condensation being effected by adjusting to a pH between 6.2 and 7.5 with a non-volatile alkali, a mixture containing the resorcinol and formaldehyde and heating the adjusted mixture to a temperature between 80 to 100° C. until the mixture undergoes no further change in viscosity.

2. A water soluble resinous product produced by the condensation of resorcinol with formaldehyde in the proportion of 0.5 to 0.73 mol of formaldehyde per mol of resorcinol and containing 10 to 100 parts of a water soluble polyhydroxy alkane per 100 parts by weight of resorcinol and 10 to 65 parts of a water soluble monohydroxy alkane per 100 parts by weight of resorcinol, said polyhydroxy alkane having not more than six carbon atoms, said monohydroxy alkane having not more than three carbon atoms and said condensation being effected by adjusting to a pH between 6.2 and 7.5 with a non-volatile alkali a mixture containing the resorcinol and formaldehyde and heating the adjusted mixture to a temperature between 80 to 100° C. until the mixture undergoes no further change in viscosity.

3. A water soluble resinous product produced by the condensation of resorcinol and formaldehyde in the proportion of 0.5 to 0.73 mol of formaldehyde per mol of resorcinol and containing 10 to 100 parts of glycerine per 100 parts by weight of resorcinol, said condensation being effected by adjusting to a pH between 6.2 and 7.5 with a nonvolatile alkali a mixture containing the resorcinol and formaldehyde and heating the adjusted mixture to a temperature between 80 to 100° C. until the mixture undergoes no further change in viscosity.

4. A water soluble resinous product produced by the condensation of resorcinol and formaldehyde in the proportion of 0.5 to 0.73 mol of formaldehyde per mol of resorcinol and containing 10 to 100 parts of ethylene glycol per 100 parts by weight of resorcinol, said condensation being effected by adjusting to a pH between 6.2 and 7.5 with a non-volatile alkali a mixture containing the resorcinol and formaldehyde and heating the adjusted mixture to a temperature between 80 to 100° C. until the mixture undergoes no further change in viscosity.

5. A process of producing a water soluble resinous product comprising adjusting to a pH between 6.2 and 7.5, a mixture of resorcinol and formaldehyde in the proportion of 0.5 to 0.73 mol of formaldehyde per mol of resorcinol, heating the resulting mixture to a temperature between 80 to 100° C. until the reaction mixture undergoes no further change in viscosity and adding 10 to 100 parts of a water soluble polyhydroxy alkane per 100 parts by weight of resorcinol, said polyhydroxy alkane having not more than six carbon atoms.

6. A process of producing a water soluble resinous product comprising adjusting to a pH between 6.2 and 7.5 with a non-volatile alkali a mixture of resorcinol, formaldehyde and a water soluble polyhydroxy alkane having not more than six carbon atoms in the proportions of 0.5 to 0.73 mol of formaldehyde per mol of resorcinol and 10 to 100 parts of said polyhydroxy alkane per 100 parts by weight of resorcinol and heating the adjusted mixture to a temperature between 80 to 100° C. until the mixture undergoes no further change in viscosity.

7. A process of producing a water soluble resinous product comprising adjusting to a pH between 6.2 and 7.5 with a non-volatile alkali a mixture of resorcinol, formaldehyde, glycerine and a water soluble monohydroxy alkane having not more than three carbon atoms in the proportions of 0.5 to 0.73 mol of formaldehyde per mol of resorcinol, 10 to 100 parts of glycerine per 100 parts by weight of resorcinol and 10 to 65 parts of said monohydroxy alkane per 100 parts by weight of resorcinol and heating the adjusted mixture to a temperature of 80 to 100° C. until the mixture undergoes no further change in viscosity.

8. A process of producing a water soluble resinous product comprising adjusting to a pH between 6.2 and 7.5 with a non-volatile alkali a mixture of resorcinol, formaldehyde, ethylene glycol and a water soluble monohydroxy alkane having not more than three carbon atoms in the proportions of 0.5 to 0.73 mol of formaldehyde per mol of resorcinol, 10 to 100 parts of ethylene glycol per 100 parts by weight of resorcinol and 10 to 65 parts of said monohydroxy alkane per 100 parts by weight of resorcinol and heating the adjusted mixture to a temperature of 80 to 100° C. until the mixture undergoes no further change in viscosity.

RAYMOND J. SPAHR.
DAVID J. LIEB.

REFERENCES CITED

The following references are of record in the file of this patent:

UNITED STATES PATENTS

| Number | Name | Date |
|---|---|---|
| 1,147,264 | Peter | July 20, 1915 |
| 1,827,591 | Lawrence | Oct. 13, 1931 |
| 1,849,109 | Novotny | Mar. 15, 1932 |
| 1,915,282 | Beans | June 27, 1933 |
| 2,385,374 | Rhodes | Sept. 25, 1945 |

FOREIGN PATENTS

| Number | Country | Date |
|---|---|---|
| 550,693 | Great Britain | Jan. 20, 1943 |